United States Patent [19]
Fukuchi et al.

[11] Patent Number: 5,818,119
[45] Date of Patent: Oct. 6, 1998

[54] ALTERNATOR CONTROL SYSTEM

[75] Inventors: Hironao Fukuchi; Yuichi Shimasaki; Hiroaki Kato; Akihisa Saito; Hideo Furumoto, all of Wako; Takayoshi Nakayama, Tochigi-ken, all of Japan

[73] Assignee: Honda Giken Kogyo Kabushiki Kaisha, Tokyo, Japan

[21] Appl. No.: 802,347

[22] Filed: Feb. 11, 1997

[30] Foreign Application Priority Data

Feb. 14, 1996 [JP] Japan .................................. 8-049591

[51] Int. Cl.$^6$ ....................................................... F01N 3/10
[52] U.S. Cl. .......................... 307/10.1; 60/300; 219/205
[58] Field of Search .................................. 307/9.1, 10.1, 307/117; 60/300, 284; 219/202, 205; 322/62–64; 340/455; 361/18.21; 363/48

[56] References Cited

U.S. PATENT DOCUMENTS

| | | | |
|---|---|---|---|
| 4,490,779 | 12/1984 | Minks | 363/48 |
| 4,791,349 | 12/1988 | Minks | 363/48 |
| 5,404,720 | 4/1995 | Laing | 60/284 |
| 5,512,789 | 4/1996 | Lyon | 307/10.1 |
| 5,523,547 | 6/1996 | Miller | 219/202 |

FOREIGN PATENT DOCUMENTS

8-296431  11/1996  Japan .

Primary Examiner—Richard T. Elms
Attorney, Agent, or Firm—Nikaido, Marmelstein, Murray & Oram LLP

[57] ABSTRACT

A control system controls an alternator driven by an internal combustion engine, for generating electric power. A changeover switch selectively switches the destination of electric power generated by the alternator to a plurality of electric load groups having respective different load voltage values, each electric load group having at least one electric load. An ECU controls switching operation of the changeover switch and changes output voltage from the alternator between a plurality of different predetermined voltage values corresponding, respectively, to the plurality of electric load groups, according to a direction in which the changeover switch has been switched. When switching of the changeover switch has occurred, the output voltage from the alternator to be supplied to one of the plurality of electric load groups to which the destination of electric power generated by the alternator has been switched is controlled by the ECU in a manner such that the output voltage progressively changes to one of the plurality of different predetermined voltage values corresponding to the one of the plurality of electric load groups.

5 Claims, 7 Drawing Sheets

ALTERNATOR CONTROL SYSTEM

BACKGROUND OF THE INVENTION

1. Field of the Invention

This invention relates to a control system for an alternator which is driven by an internal combustion engine to generate output voltage which is changed according to an electric load or electric loads connected to the alternator.

2. Prior Art

A catalyzer employed in an internal combustion engine, for purifying exhaust gases emitted from the engine does not become activated until a considerable time period elapses after the start of the engine when the engine is started in a cold state. To accelerate the activation of the catalyzer, there is conventionally employed an electrically-heated catalyzer which is electrically heated to become promptly activated. To control energization of the electrically-heated catalyzer, a control method has been proposed, for example, by the present assignee by Japanese Laid-Open Patent Publication (Kokai) No. 8-296431 and pending U.S. Ser. No. 08/634,507 filed on Apr. 18, 1996 corresponding thereto, in which an energization time period TEHC of the electrically-heated catalyzer is set according to a detected engine temperature or a like parameter, and then the destination of electric power supplied from the alternator is switched from electrical equipment, i.e. electric systems mounted on a chassis of the vehicle, to the electrically-heated catalyzer by means of a changeover switch to energize the catalyzer over the thus set energization time period TEHC. Upon the switching of the destination of electric power, output voltage VALT from the alternator is raised from a normal voltage value V1 (first predetermined voltage value, e.g. 14.5 V) to a second predetermined voltage value V2, e.g. 30 V, which is higher than the first predetermined voltage value V1, to thereby supply the thus raised output voltage to the electrically-heated catalyzer (see FIG. 1). While the changeover switch is set to the electrically-heated catalyzer side, voltage required for the electrical equipment is supplied from a battery of the vehicle.

Figure 1:
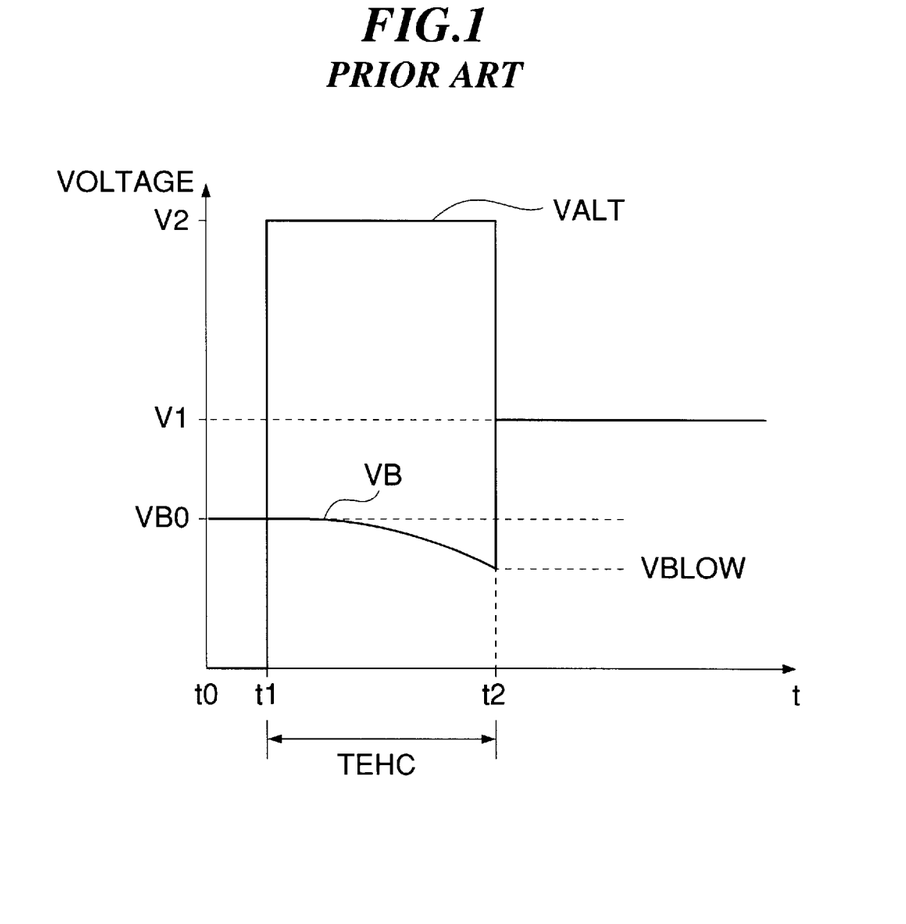
FIG. 1 is a timing chart showing changes in output voltage from an alternator of an internal combustion engine and output voltage from a battery of a vehicle in which the engine is installed, according to a conventional alternator control system.

However, voltage VB at an output terminal of the battery normally assumes, e.g. approximately 12.5 V (see VB0 in FIG. 1) even when load current flowing through the electrical equipment is small, i.e. the battery voltage VB is generally lower than the first predetermined voltage V1. Further, when all the electric power required for the electrical equipment is supplied from the battery, the battery voltage VB can drop below 12.5 V, which can cause the following inconveniences:

That is, as shown in FIG. 1, if the changeover switch is changed in position from the electrically-heated catalyzer side to the electrical equipment side when the battery voltage VB drops to a value VBLOW during energization of the electrically-heated catalyzer at a time point t2, the voltage supplied to the electrical equipment sharply rises from the value VBLOW to the value V1. As a result, lighting equipment (headlights, room lamps, indicator lamps, etc.) can become suddenly lighter, or a correction term for correcting a fuel amount supplied to the engine, which is determined depending on the battery voltage VB, can suddenly change so that the engine rotational speed fluctuates.

SUMMARY OF THE INVENTION

It is the object of the invention to provide an alternator control system which is capable of properly controlling output voltage to be generated by the alternator when the engine is started in a cold state, to thereby prevent a sudden change in the illuminance of lighting equipment and/or fluctuations in the fuel amount supplied to the engine.

To attain the above object, the present invention provides a control system for controlling a control system for controlling an alternator driven by an internal combustion engine, for generating electric power, comprising:

a changeover switch for selectively switching destination of electric power generated by the alternator to a plurality of electric load groups having respective different load voltage values, each of the plurality of electric load groups having at least one electric load; and control means for controlling switching operation of the changeover switch and for changing output voltage from the alternator between a plurality of different predetermined voltage values corresponding, respectively, to the plurality of electric load groups, according to a direction in which the changeover switch has been switched;

the control means being responsive to the switching of the changeover switch, for controlling the output voltage from the alternator to be supplied to one of the plurality of electric load groups to which the destination of electric power generated by the alternator has been switched, in a manner such that the output voltage progressively changes to one of the plurality of the different predetermined voltage values corresponding to the one of the plurality of electric load groups.

Preferably, the engine has an exhaust system, and an electrically-heated catalyzer arranged in the exhaust system and connected to the alternator to be electrically heated by the electric power generated by the alternator, the plurality of electric load groups being a first group comprising the electrically-heated catalyzer and a second group comprising electric loads other than the electrically-heated catalyzer.

More preferably, the control means changes the output voltage from the alternator between a first predetermined voltage value corresponding to the second group and a second predetermined voltage value corresponding to the first group, the second predetermined voltage value being higher than the first predetermined voltage value, when the destination of electric power generated by the alternator has been switched between the first group and the second group.

Advantageously, the engine is installed in a vehicle having a battery, the control means changing the output voltage from the alternator from the second predetermined voltage value to the first predetermined voltage value, by controlling the output voltage from the alternator to a value almost equal to output voltage from the battery assumed immediately before the changing of the output voltage from the alternator, and then progressively increasing the output voltage from the alternator to the first predetermine voltage value.

Preferably, the control means controls the switching operation of the changeover switch so as to supply the output voltage from the alternator to the electrically-heated catalyzer over a first predetermined time period, controls the output voltage from the alternator to a value almost equal to the output voltage from the battery assumed immediately before the changing of the output voltage from the alternator over a second predetermined time period after the first predetermined time period elapses, and progressively increases the output voltage from the alternator to the first predetermined voltage value after the second predetermined time period elapses.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 2:
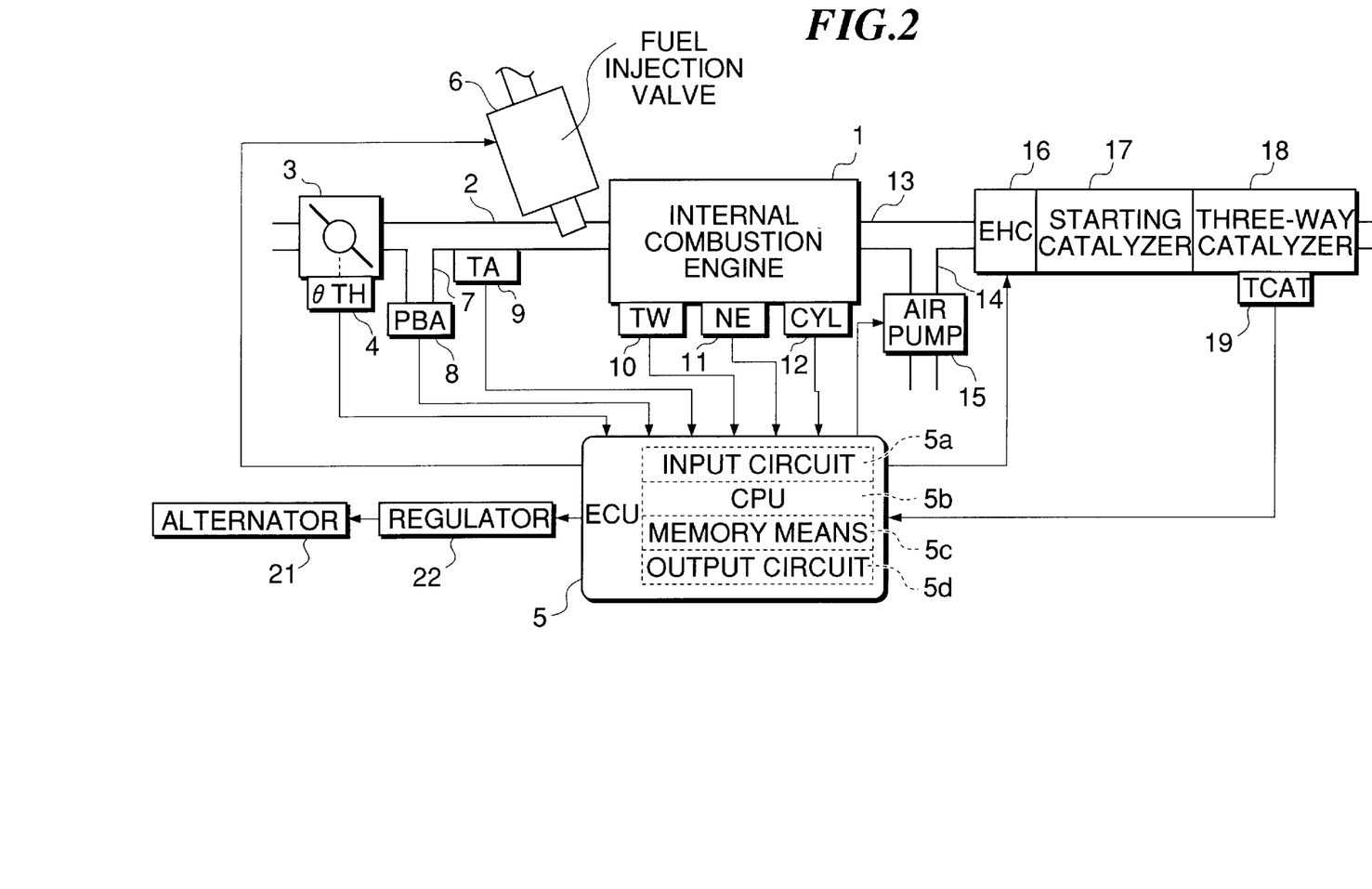
FIG. 2 is a block diagram schematically showing the whole arrangement of an internal combustion engine and an alternator control system therefor, according to an embodiment of the invention.

Referring first to FIG. 2, there is illustrated the whole arrangement of an internal combustion engine and an alternator control system therefor, according to an embodiment of the invention. In the figure, reference numeral 1 designates an internal combustion engine (hereinafter referred to as "the engine"), which has an intake pipe 2 connected to the cylinder block of the engine 1, in which is arranged a throttle valve 3. A throttle valve opening (θTH) sensor 4 is connected to the throttle valve 3, for generating an electric signal indicative of the sensed throttle valve opening θTH to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is connected via a conduit 7 to the intake pipe 2 at a location immediately downstream of the throttle valve 3, for sensing absolute pressure PBA within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, which is filled with engine coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a signal pulse (hereinafter referred to as "a TDC signal pulse") at each of predetermined crank angles (e.g. whenever the crankshaft rotates through 180 degrees when the engine is of a 4-cylinder type) which each correspond to a predetermined crank angle before a top dead point (TDC) of each cylinder corresponding to the start of the suction stroke of the cylinder, while the CYL sensor 12 generates a signal pulse at a predetermined crank angle of a particular cylinder of the engine, both of the pulses being supplied to the ECU 5.

An electrically-heated catalyzer (hereinafter referred to as "the EHC") 16, a starting catalyzer 17, and a three-way catalyzer 18 are arranged in an exhaust pipe 13 connected to the engine 1 in this order from an upstream side thereof, for purifying noxious components in exhaust gases from the engine, such HC, CO, and NOx. The starting catalyzer 17 is a small-sized catalyzer provided mainly for purifying exhaust gases emitted from the engine immediately after starting thereof.

Extending from the exhaust pipe 13 is a passage 14 for supplying secondary air into the exhaust pipe 13 at a location upstream of the EHC 16, in which is arranged an air pump 15.

The EHC 16 and the air pump 15 are electrically connected to the ECU 5 to have their operations controlled by signals from the ECU 5. Further, a catalyst temperature sensor 19 is connected to the three-way catalyzer 18, for supplying an electric signal indicative of the sensed catalyzer temperature TCAT to the ECU 5.

Further, an alternator 21, which is driven by the engine 1, is electrically connected to the ECU 5 via a regulator 22 such that voltage generated by the alternator 21 is controlled by a signal from the ECU 5. More specifically, the ECU 5 controls the output voltage from the alternator by delivering to the regulator 22 a signal for controlling a duty ratio DUTY with which a field winding of the alternator 21 is to be energized.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom, etc., and an output circuit 5d which delivers control signals to the fuel injection valves 6, air pump 15, EHC 16, regulator 22, etc., for driving the same.

The CPU 5b calculates an energization time period TEHC of the EHC 16 and the energization duty ratio DUTY of the field winding of the alternator 21, to generate control signals based on results of the calculations.

Figure 3:
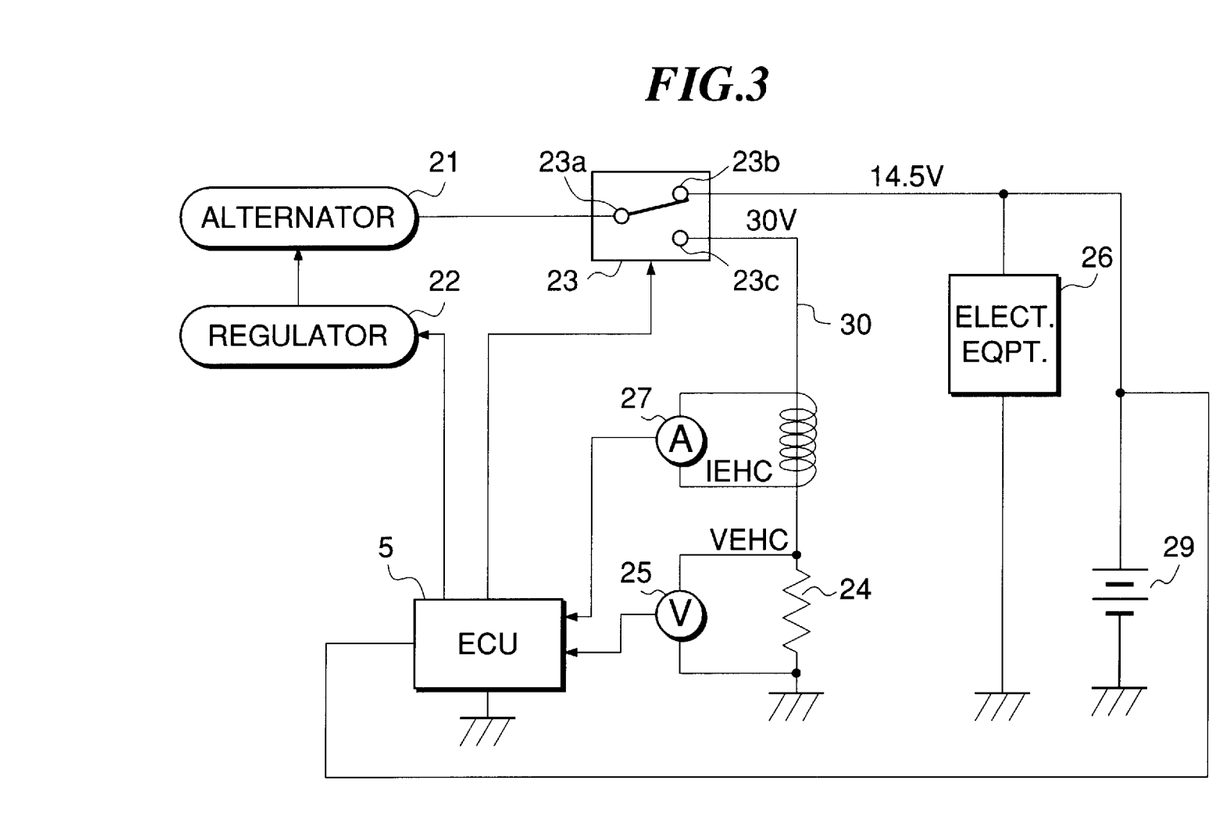
FIG. 3 is a circuit diagram showing the connection of a heater resistance of an electrically-heated catalyzer appearing in FIG. 2 and its related or peripheral circuit parts.

FIG. 3 shows a circuit formed by a heater resistance 24 of the EHC 16, etc., employed in the present embodiment. The EHC 16 also acts as a heater, that is, it has a catalyst body thereof supplied with current to be heated thereby. The electrical resistance of the catalyst body is represented as the heater resistance 24.

The alternator 21 has an output thereof connected to a terminal 23a of a changeover switch 23 which has another terminal 23c connected to one end of the heater resistance 24 through a connecting line 30. The other end of the heater resistance 24 is grounded.

The changeover switch 23 has a further terminal 23b connected to a positive electrode of a battery 29 as well as to one end of electrical equipment (lighting equipment, audio system, etc.) 26. The electrical equipment 26 has the other end grounded. The battery 29 has its negative electrode grounded and its positive electrode connected to the ECU 5 which measures voltage VB output from the output terminal of the battery 29 (hereinafter referred to simply as the "output voltage VB").

The switch 23 is electrically connected to the ECU 5 to have its switching operation controlled by a signal from the ECU 5. The switch 23 is normally in a position shown in FIG. 3 in which the terminals 23a and 23b of the switch 23 are connected to each other, and controlled to be changed in position from its illustrated position immediately after the start of the engine 1, if required. Further, a voltage sensor 25 for detecting EHC voltage VEHC across the heater resistance 24 is connected to both ends of the heater resistance 24. The voltage sensor 25 is electrically connected to the ECU 5, for supplying a signal indicative of the sensed voltage VEHC. Further, an electric current sensor 27 for detecting heater current IEHC flowing through the heater resistance 24 is provided on the connecting line 30 at a location upstream of the heater resistance 24. The electric current sensor 27 is electrically connected to the ECU 5, for supplying a signal indicative of the sensed electric current to the ECU 5.

The switch 23 is changed to a position in which the terminal 23a and the terminal 23c are connected to each other only when the heater resistance 24 of the EHC 16 is energized. The energization time period TEHC of the heater resistance 24 is determined according to the engine coolant temperature TW and the intake air temperature TA assumed at the start of the engine 1.

Figure 4:
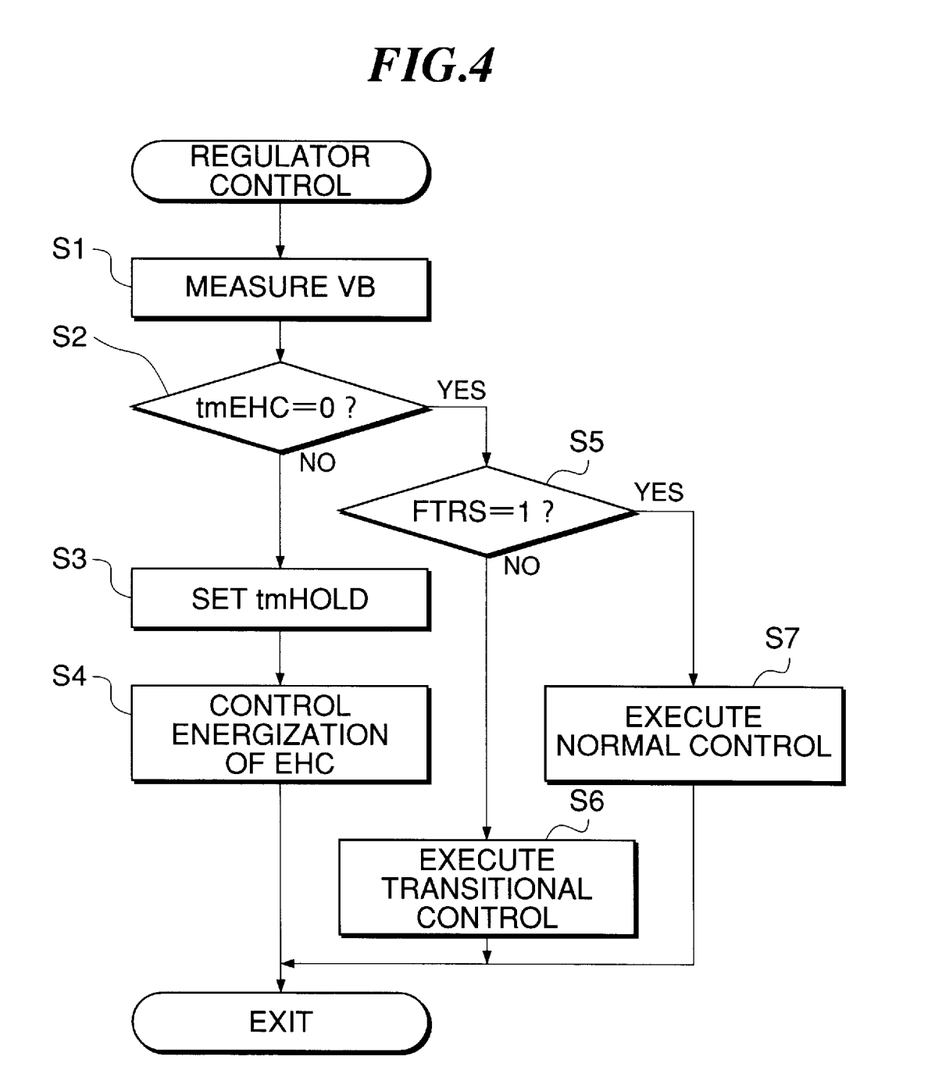
FIG. 4 is a flowchart showing a main routine for controlling a regulator appearing in FIG. 2.

FIG. 4 shows a main routine for controlling the operation of the regulator 22, according to the present embodiment. This program is executed at predetermined time intervals.

First, at a step S1, the output voltage VB from the battery 29 is measured and stored. Then, at a step S2, it is determined whether or not the count value of a down-counting timer tmEHC which starts down-counting upon the start of energization of the heater resistance 24 (at a time point t1 in FIG. 7) is equal to "0". The timer tmEHC is set to the predetermined energization time period TEHC. If tmEHC>0 holds, a down-counting timer tmHOLD, referred to hereinafter at a step S6, is set to a predetermined holding time period THOLD and started at a step S3, followed by executing energization control of the heater resistance 24 at a step S4. More specifically, the energization duty ratio DUTY is set such that output voltage VALT from the alternator 21 is equal to a second predetermined voltage V2 (e.g. 30 V), followed by terminating the present routine. So long as tmEHC>0 holds, the switch 23 is kept in a position where the terminals 23a and 23c are connected to each other.

When tmEHC=0 holds at the step S2, i.e. when the predetermined time period TEHC has elapsed from the start of energization of the heater resistance 24 (at a time point t2 in FIG. 7), it is determined at a step S5 whether or not a transition flag FTRS which, when set to "0", indicates that the output voltage VALT from the alternator 21 is in a transitional state, is equal to "0". If FTRS=0 holds, transitional control is carried out at the step S6. At the time point t2, the connection of the terminal 23a of the switch 23 is changed over from the terminal 23c to the terminal 23b, by a routine, not shown.

Figure 5:
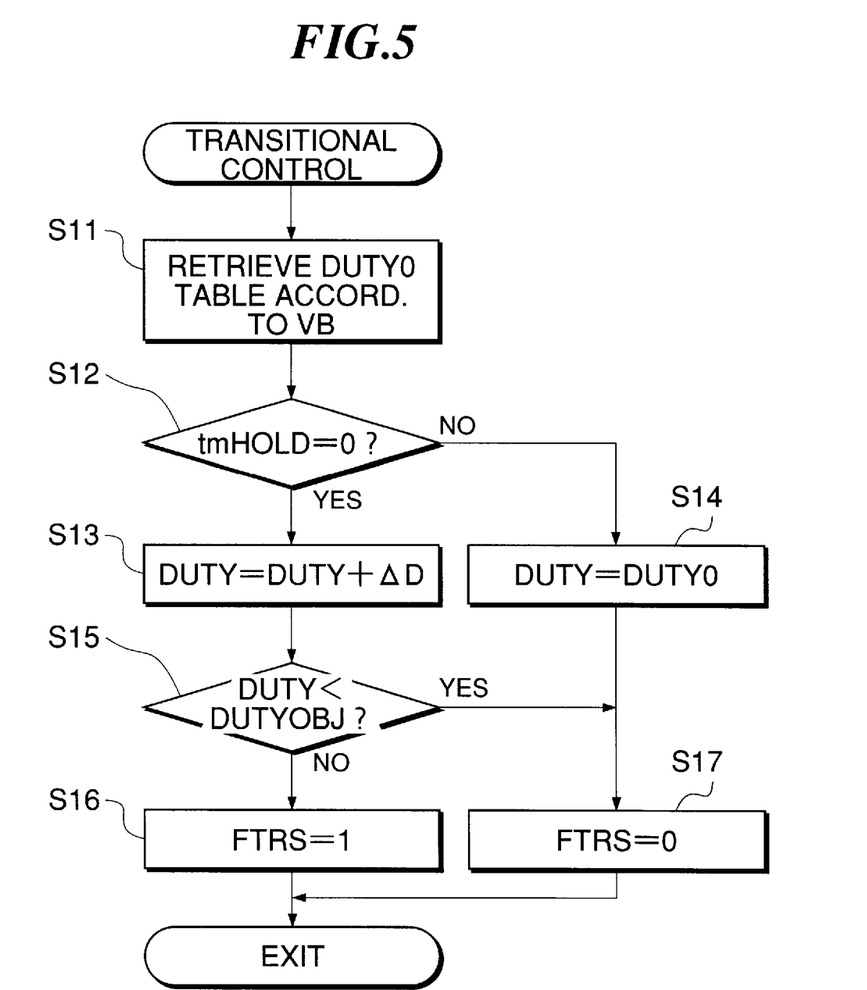
FIG. 5 is a flowchart showing a subroutine for carrying out transition control executed at a step S6 in the FIG. 4 main routine.
Figure 6:
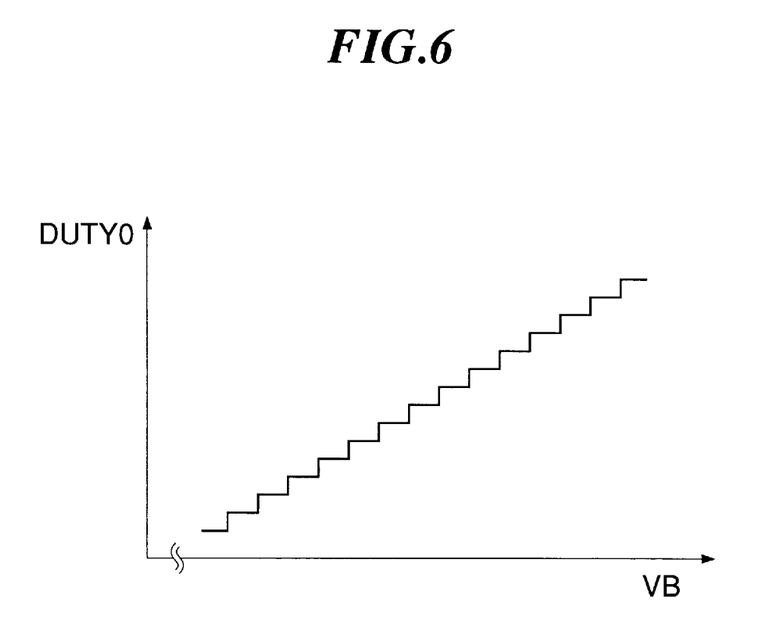
FIG. 6 shows a table for determining an initial value DUTY0 of a duty ratio for the alternator.

FIG. 5 shows a subroutine for carrying out the transition control executed at the step S6 in FIG. 4. First, at a step S11, a DUTY0 table is retrieved according to the battery output voltage VB, to thereby determine an initial value DUTY0 of the energization duty ratio DUTY. The DUTY0 table is set as shown in FIG. 6, such that when the energization duty ratio DUTY is equal to the initial value DUTY0, the alternator output voltage VALT is set to a value almost equal to the battery output voltage VB.

At the following step S12, it is determined whether or not the count value of the holding timer tmHOLD is equal to "0". If tmHOLD>0 holds, the energization duty ratio DUTY is set to the initial value DUTY0 at a step S14, and then the transition flag FTRS is set to "0" at a step S17, followed by terminating the present routine. Accordingly, the alternator output voltage VALT is almost held equal to the battery output voltage VB over a time period from the time point t2 to a time point t3 in FIG. 7.

If tmHOLD=0 holds at the step S12, the duty ratio DUTY is calculated at a step S13, by the use of the following equation (1):

$$DUTY = DUTY + \Delta D \quad (1)$$

where $\Delta D$ represents a predetermined increment.

Figure 7:
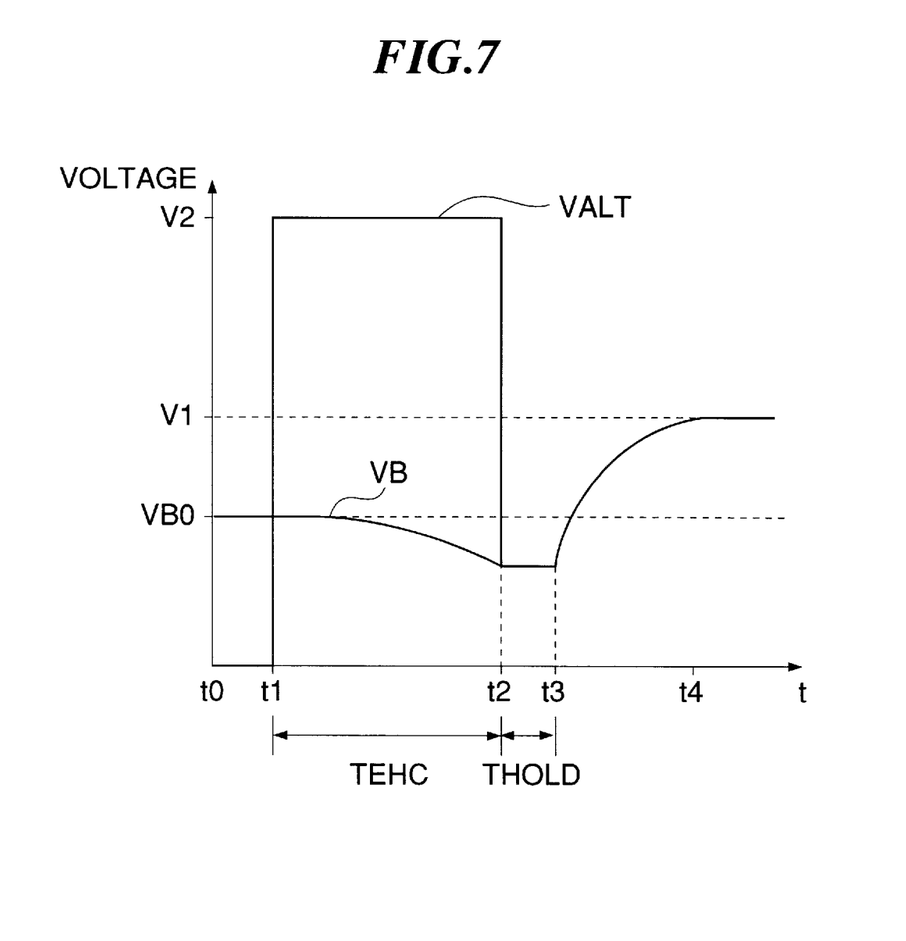
FIG. 7 is a timing chart showing changes in the output voltage from the alternator and the output voltage from the battery.

As a result, the duty ratio DUTY is progressively increased, and hence the alternator output voltage VALT progressively increases (from the time point t3 to a time point t4 in FIG. 7).

At the following step S15, it is determined whether or not the duty ratio DUTY is smaller than a desired value DUTYOBJ, which is set to such a value that the output voltage VALT from the alternator 21 is equal to the second predetermined voltage value V2. If DUTY<DUTYOBJ holds, the program proceeds to the step S17. On the other hand, if DUTY$\geq$DUTYOBJ holds (at the time point t4 in FIG. 7), the alternator output voltage VALT becomes almost equal to a first predetermined voltage V1 (e.g. 14.5 V), and therefore the transition flag FTRS is set to "1" at a step S16, followed by terminating the present routine.

Referring again to FIG. 4, if the flag FTRS is set to "1", the program proceeds from the step S5 to a step S7, wherein normal control is executed, i.e. the alternator output voltage VALT is held at the first predetermined voltage V1.

As described hereinabove, according to the processings of FIGS. 4 and 5, if the switch 23 is changed over to change the alternator output voltage VALT from the second predetermined voltage V2 to the first predetermined voltage V1, the alternator 21 is controlled such that the voltage supplied to the electrical equipment 26 progressively increases, to thereby prevent a sudden change in the illuminance of the lighting equipment and/or fluctuations in the fuel amount supplied to the engine.

The present invention is not limitative to the above described embodiment incorporating an electrically heated catalyzer, but it is applicable to various cases where the destination of electric power generated by the alternator is selectively switched to a plurality of electric loads having different load voltage values.

What is claimed is:

1. A control system for controlling an alternator driven by an internal combustion engine, for generating electric power, comprising:

a changeover switch for selectively switching destination of electric power generated by said alternator to a plurality of electric load groups having respective different load voltage values, each of said plurality of electric load groups having at least one electric load; and control means for controlling switching operation of said changeover switch and for changing output voltage from said alternator between a plurality of different predetermined voltage values corresponding, respectively, to said plurality of electric load groups, according to a direction in which said changeover switch has been switched;

said control means being responsive to the switching of said changeover switch, for controlling said output voltage from said alternator to be supplied to one of said plurality of electric load groups to which said destination of electric power generated by said alternator has been switched, in a manner such that said output voltage progressively changes to one of said plurality of different predetermined voltage values corresponding to said one of said plurality of electric load groups.

2. A control system as claimed in claim 1, wherein said engine has an exhaust system, and an electrically-heated catalyzer arranged in said exhaust system and connected to said alternator to be electrically heated by said electric power generated by said alternator, said plurality of electric load groups being a first group comprising said electrically-heated catalyzer and a second group comprising electric loads other than said electrically-heated catalyzer.

3. A control system as claimed in claim 2, wherein said control means changes said output voltage from said alternator between a first predetermined voltage value corresponding to said second group and a second predetermined voltage value corresponding to said first group, said second predetermined voltage value being higher than said first predetermined voltage value, when said destination of electric power generated by said alternator has been switched between said first group and said second group.

4. A control system for controlling an alternator driven by an internal combustion engine, for generating electric power, comprising:

a changeover switch for selectively switching destination of electric power generated by said alternator to a plurality of electric load groups having respective different load voltage values, each of said plurality of electric load groups having at least one electric load; and control means for controlling switching operation of said changeover switch and for changing output voltage from said alternator between a plurality of different predetermined voltage values corresponding, respectively, to said plurality of electric load groups, according to a direction in which said changeover switch has been switched;

said control means being responsive to the switching of said changeover switch, for controlling said output voltage from said alternator to be supplied to one of said plurality of electric load groups to which said destination of electric power generated by said alternator has been switched, in a manner such that said output voltage progressively changes to one of said plurality of different predetermined voltage values corresponding to said one of said plurality of electric load groups, wherein said engine has an exhaust system, and an electrically-heated catalyzer arranged in said exhaust system and connected to said alternator to be electrically heated by said electric power generated by said alternator, said plurality of electric load groups being a first group comprising said electrically-heated catalyzer and a second group comprising electric loads other than said electrically-heated catalyzer, and wherein said control means changes said output voltage from said alternator between a first predetermined voltage value corresponding to said second group and a second predetermined voltage value corresponding to said first group, said second predetermined voltage value being higher than said first predetermined voltage value, when said destination of electric power generated by said alternator has been switched between said first group and said second group, and wherein said engine is installed in a vehicle having a battery, said control means changing said output voltage from said alternator from said second predetermined voltage value to said first predetermined voltage value, by controlling said output voltage from said alternator to a value almost equal to output voltage from said battery assumed immediately before said changing of said output voltage from said alternator, and then progressively increasing said output voltage from said alternator to said first predetermine voltage value.

5. A control system as claimed in claim 4, wherein said control means controls said switching operation of said changeover switch so as to supply said output voltage from said alternator to said electrically-heated catalyzer over a first predetermined time period, controls said output voltage from said alternator to a value almost equal to said output voltage from said battery assumed immediately before said changing of said output voltage from said alternator over a second predetermined time period after said first predetermined time period elapses, and progressively increases said output voltage from said alternator to said first predetermined voltage value after said second predetermined time period elapses.

\* \* \* \* \*